United States Patent [19]

Feliks et al.

[11] Patent Number: 4,705,159
[45] Date of Patent: Nov. 10, 1987

[54] CONVEYING SYSTEM FOR REMOVING CONTAINERS FROM A PACKAGING MACHINE

[75] Inventors: James J. Feliks, Doraville; Will L. Culpepper, Covington; Dale K. Scott, Jonesboro, all of Ga.

[73] Assignee: The Mead Corporation, Dayton, Ohio

[21] Appl. No.: 869,249

[22] Filed: Jun. 2, 1986

[51] Int. Cl.⁴ ............................................. B65G 25/00
[52] U.S. Cl. ................................. 198/468.8; 198/433; 198/817
[58] Field of Search ............ 198/415, 429, 433, 468.8, 198/623, 627, 628, 817, 803.1

[56] References Cited

U.S. PATENT DOCUMENTS

| | | | |
|---|---|---|---|
| 2,297,295 | 9/1942 | Flintjer | 198/628 |
| 2,696,927 | 12/1954 | Copping | 198/803.1 X |
| 2,727,642 | 12/1955 | Haycock | 198/433 X |
| 3,462,001 | 8/1969 | Boyce | 198/623 X |
| 3,857,474 | 12/1974 | Hutson | 198/627 |
| 4,422,541 | 12/1983 | Lisel | 198/627 |

FOREIGN PATENT DOCUMENTS

| | | | |
|---|---|---|---|
| 81458 | 11/1956 | Denmark | 198/628 |
| 2322941 | 11/1974 | Fed. Rep. of Germany | 198/468.8 |

Primary Examiner—Stephen J. Novosad
Assistant Examiner—John F. Letchford
Attorney, Agent, or Firm—Rodgers & Rodgers

[57] ABSTRACT

A system for removing flanged containers from a packaging machine includes a pair of conveyor chains having horizontally spaced longitudinally movable working reaches, a plurality of yieldable clips secured to each of said chains and having container engaging edges disposed between the chains, movable structure for engaging filled and sealed containers and for moving such containers upwardly between the chains and into engagement with at least one clip on each of the chains to cause the clips to flex upwardly and to allow the container flange to move above the clips whereby the container is supported by the clips for movement out of the packaging machine.

11 Claims, 6 Drawing Figures

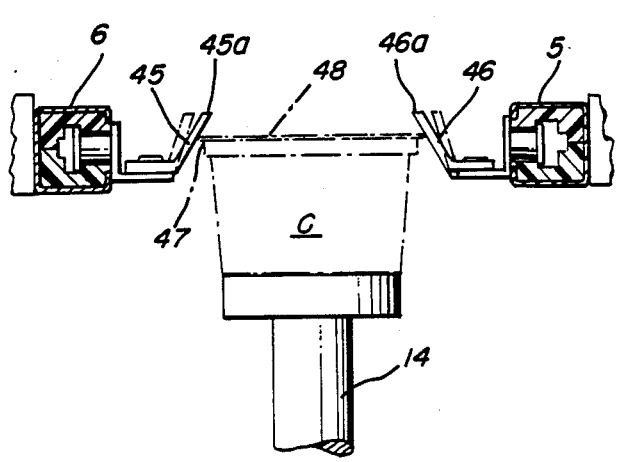
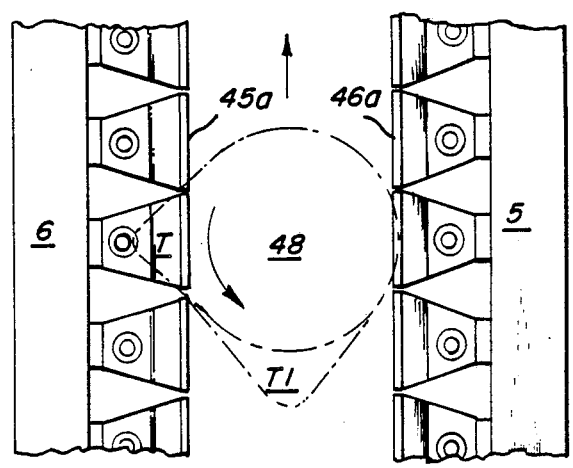
FIG. 4  FIG. 5
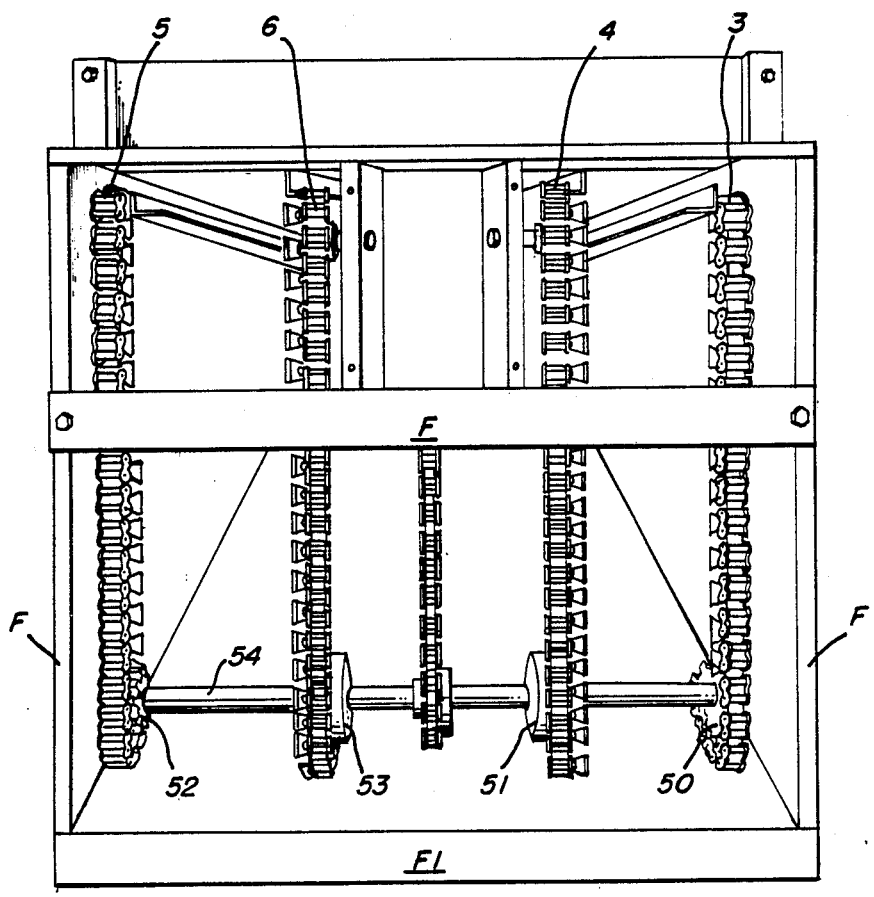
FIG. 6

CONVEYING SYSTEM FOR REMOVING CONTAINERS FROM A PACKAGING MACHINE

TECHNICAL FIELD

This invention relates to packaging machines and particularly concerns a conveying system for removing filled and sealed containers from a container filling and sealing machine.

BACKGROUND ART

U.S. Pat. Nos. 4,235,265 issued Nov. 25, 1980; 4,282,699 issued Aug. 11, 1981; 4,391,080 issued July 5, 1983; and 4,097,775 issued Oct. 18, 1983 concern filling and sealing apparatus for containers used in conjunction with aseptic packaging systems and are all owned by the assignee of this invention.

DISCLOSURE OF THE INVENTION

According to this invention in one form, containers which are filled and sealed are removed from the filling and sealing machine by means of a pair of horizontally spaced chains on which a plurality of yieldable clips are secured and arranged so that filled and sealed containers are inserted between the clips on the spaced chains for movement out of and away from the packaging machine.

BRIEF DESCRIPTION OF THE DRAWINGS

In the drawings

FIG. 4 is a cross sectional view taken along the line designated 4—4 in FIG. 1;

FIG. 5 is a plan view of the mechanism shown in FIG. 4 and

FIG. 6 is an end view of the outfeed end of the mechanism shown in FIG. 1.

BEST MODE OF CARRYING OUT THE INVENTION

Figure 1:
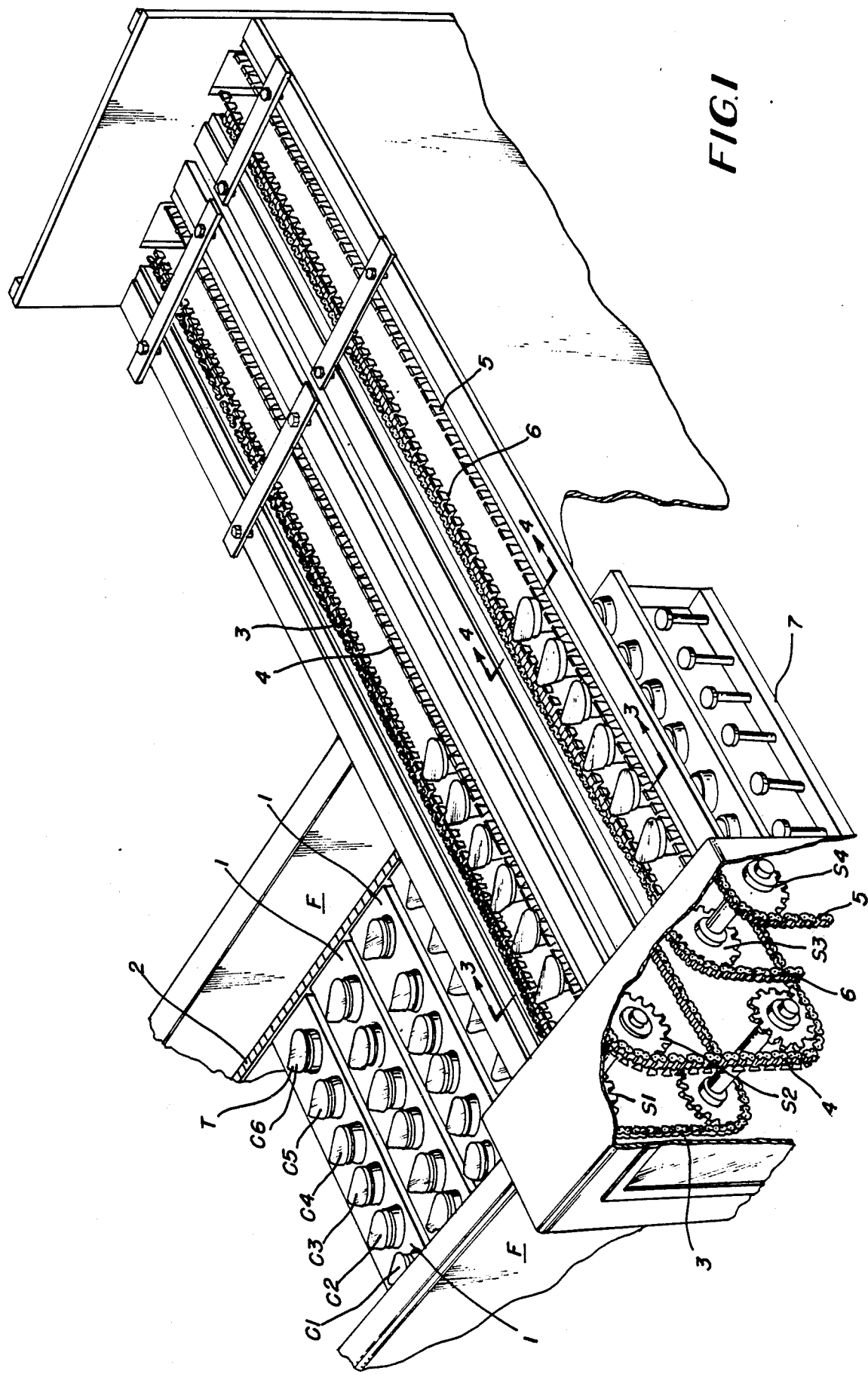
FIG. 1 is a perspective view of a conveying system formed according to this invention.
Figure 3:
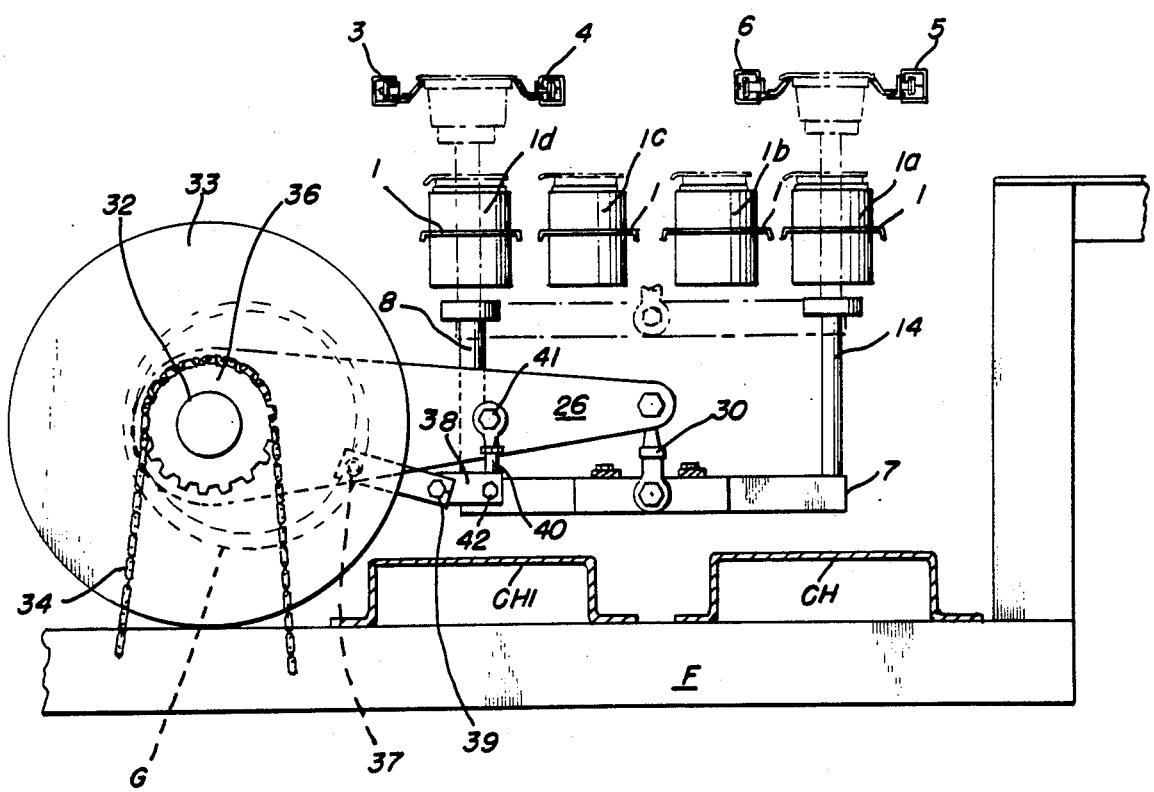
FIG. 3 is a cross sectional view taken along the line designated 3—3 in FIG. 1.

In FIGS. 1, 3 and 6, frame elements of the packaging machine are indicated at F and at CH and at CH1. A series of support plates designated by the numeral 1 are mounted at their ends on chains 2, only one of which is observable in FIG. 1. Each support plate provides support for filled and sealed containers designated C1–C6 inclusive. Each cover for the sealed containers C1–C6 includes a laterally projecting tab indicated at T in connection with container C6. This tab is to facilitate removal of the container cover to expose the container contents.

For the purpose of removing the containers C1–C6 from the packaging machine, two pairs of endless chains 3, 4, 5 and 6 are provided and are trained about suitable sprockets S1–S4 and function in known manner to cause the upper or working reach of the chains 3–6 to move generally from left to right as viewed in FIG. 1. The filled and sealed containers C1–C6 as shown in FIG. 1 are moved underneath the conveyor chains 3–6 and are transferred by mechanism formed according to this invention from the chains 2 to the chains 3–6 for transport away from the packaging machine.

Disposed below the support plates 1 and the associated chains 2 is the movable mechanism shown in FIG. 2 which includes a support bracket 7 on which are mounted a plurality of pushers 8–19 inclusive. Brackets 20 and 21 are secured to support bracket 7 by suitable means such as by bolts 22 and 23. Vertical movement is guided by means of rods 24 and 25 which reciprocate through a suitable collar guide (not shown) which is fixed in position on the frame of the machine and which insures substantially vertical reciprocatory movement of the bracket 7 and the associated pushers 8–19.

For imparting vertical reciprocatory movement to the support bracket 7, a pair of oscillatable arms 26 and 27 are pivotally connected at 28 and 29 to links 30 and 31 which are secured to support bracket 7. Arms 26 and 27 are secured to rod 32 which is journally supported by the frame structure for oscillation and which is rigidly affixed to arms 26 and 27. Cam 33 is rotated by means of driving chain 34 about the shaft 32 on which pinion 36 is rotatably mounted and secured to cam 33. Cam follower 37 is provided with an extension which rides in a cam groove formed in cam 33 to impart movement to cam follower 37 relative to shaft 32. This movement swings link 38 which is secured to cam follower 37 about fixed pivot 39 and in turn imparts up and down movement to link 40 which is pivoted at 41 to arm 26 and at 42 to link 38. Thus rotation of cam 33 imparts up and down movement to support bracket 7 and to pushers 8–19 inclusive.

Figure 2:
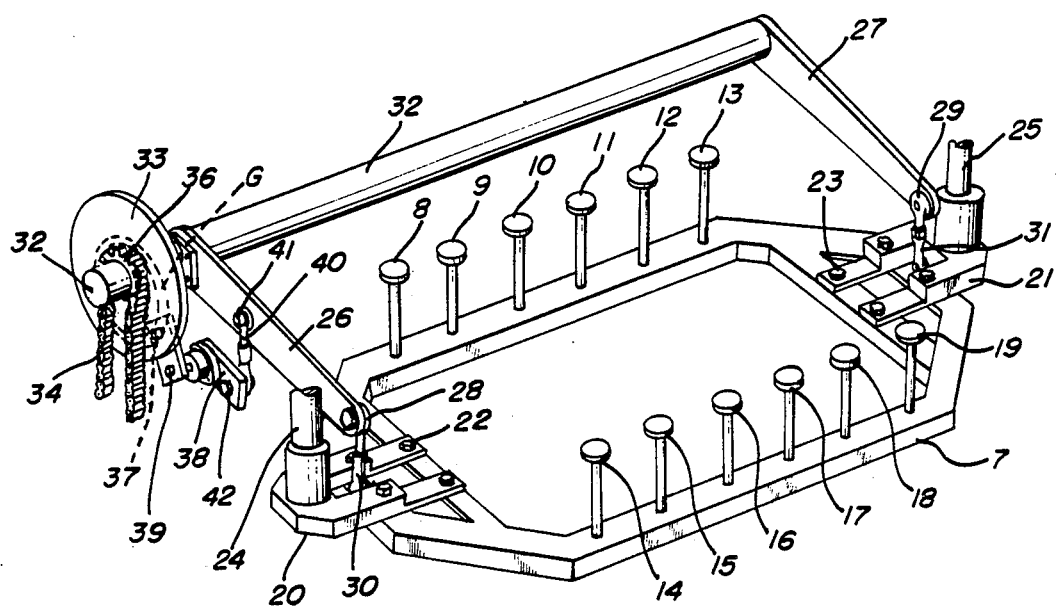
FIG. 2 is an enlarged perspective view of movable means for engaging filled and sealed containers and for imparting upward movement thereto and into cooperative engagement with spaced chains and associated clips for engaging and removing containers from the packaging machine.

The mechanism as shown in FIGS. 2 and 3 including the pushers 8 and 19 engages the bottom surfaces of the containers 1a and 1d mounted on plates 1 and elevates those containers to positions between the chains 3 and 4 and 5 and 6.

In FIG. 3, four support plates are shown. Since movement of the support plates and of chain 2 is from left to right as viewed in FIG. 3, it is the practice to move the chain 2 and support plates 1 by increments of two spaces for each incremental movement of chains 2 and plates 1. Thus the leading container such as 1a of the first pair of containers such as 1a and 1b is engaged by pusher rod 14 simultaneously with the engagement of the trailing container 1d by pusher 8 so that subsequent movement toward the right by two spaces then brings container 1c over pusher 14 and a container following container 1d by two spaces is moved over pusher 8. These two containers are then by a subsequent upward movement of the pushers 8 and 14 engaged and pushed between the chains.

As is best shown in FIG. 4, the container indicated at C is pushed upwardly by a pusher such as 14 between a pair of yieldable clips 45 and 46 which are secured respectively to chains 6 and 5. These clips are preferably formed of plastic material and as is indicated in FIG. 4 by phantom lines secured at one end to the associated chain and are bendable to yield outwardly due to upward movement of container C and pusher 14. In order that the clips are bent as indicated in FIG. 4, the chains 5 and 6 must be supported so as to prevent outward movement in a direction away from each other. Once the container is moved to a sufficient elevation, the container engaging edges 45a and 46a of clips 45 and 46 move underneath and engage the flange 47 of container C.

While the arrangement as shown and described herein elevates the container by pushers such as 8-19, the invention is not limited to such an arrangement and contemplates elevating the containers by suitable gripping devices or by other suitable means.

The cover 48 of container C is heat sealed to flange 47. As previously explained the covers include tabs T. These tabs may conceivably become entangled with the associated chain and for this reason it is desirable to rotate the containers such as C so as to cause the tab T to move to a position indicated by dotted lines and designated at T1 as shown in FIG. 5. In order to effect this result, it is simply necessary to drive one of the chains at a somewhat faster velocity than the other chain. As shown in FIG. 5 chain 5 is moving at a slightly faster velocity than chain 6 and therefore imparts a counterclockwise rotation to container C which causes the tab T to move through an angle of approximately 90 degrees to occupy the position designated at T1.

As is apparent from FIG. 5, the container engaging edges such as 45a and 46a are arranged so that these edges form a substantially continuous container engaging edge.

With the containers oriented as shown in FIG. 5, the containers are discharged from the outfeed end of the mechanism simply due to the downward movement of the chains 3-6. As is obvious from FIG. 6, chains 3-6 enter their return reaches by cooperating with sprockets 50-53 inclusive which are rotatable by shaft 54 affixed to the frame F of the machine.

Discharge of the containers from the outfeed end of the mechanism can be to any suitable conveyor or receptacle as may be desired.

INDUSTRIAL APPLICABILITY

This invention is applicable to packaging machines generally and particularly to machines which function as aseptic packaging devices for flanged containers and affords an efficient arrangement for removing filled and sealed aseptic packages from the packaging machine.

We claim:

1. A conveying system for removing filled and sealed flanged containers from a container filling and sealing machine, said system comprising a pair of conveyor chains having horizontally spaced longitudinally movable working reaches mounted so as to prevent sidewise movement away from each other, a plurality of upwardly projecting bendable clips formed of plastic material secured at lower ends thereof to each of said chains and having container engaging edges disposed between said chains, movable means for moving a filled and sealed container between said chains and to cause the flange on the container to move into engagement with the container engaging edge of at least one clip on each of said chains, and means for moving said movable means out of contact with the container to transfer support of the container to said clips.

2. A conveying system according to claim 1 wherein said container engaging edges of the clips on each of said chains form a substantially continuous container engaging edge.

3. A conveying system according to claim 1 wherein said container engaging edges of the clips on one of said chains are spaced from said container engaging edges of the clips on the other of said chains.

4. A conveying system according to claim 3 wherein the space between said container engaging edges of the clips on one of said chains and said container engaging edges of the clips on the other of said chains is less than the diameter of the container before insertion of the container therebetween.

5. A conveying system according to claim 1 wherein two pairs of chains and associated clips are arranged simultaneously to impart outfeed movement to two rows of containers.

6. A conveying system according to claim 5 wherein a plurality of containers are simultaneously moved upward by said movable means.

7. A conveying system according to claim 1 wherein one of said chains moves at a somewhat greater velocity than the other of said chains so as to impart rotation to the container about its vertical axis.

8. A conveying system according to claim 7 wherein rotation of the container is through an angle of approximately ninety degrees.

9. A conveying system for removing filled and sealed flanged containers from a container filling and sealing machine, said system comprising a pair of conveyor chains having horizontally spaced longitudinally movable working reaches, a plurality of yieldable clips secured to each of said chains and having container engaging edges disposed between said chains, said yieldable clips being inclined upwardly and inwardly while on said working reaches of said chains, movable means for moving a filled and sealed container between said chains and to cause the flange on the container to move into engagement with the container engaging edge of at least one clip on each of said chains, and means for moving said movable means out of contact with the container to transfer support of the container to said clips.

10. A conveying system for removing filled and sealed flanged containers from a container filling and sealing machine, said system comprising a pair of conveyor chains having horizontally spaced longitudinally movable working reaches a plurality of yieldable clips secured to each of said chains and having container engaging edges disposed between said chains, movable means for moving a filled and sealed container between said chains and to cause the flange on the container to move into engagement with the container engaging edge of at least one clip on each of said chains, and means for moving said movable means out of contact with the container to transfer support of the container to said clips, said chains and clips being movable downwardly at the outfeed end of said working reaches to discharge the container into a receiving station.

11. A conveying system for removing filled and sealed flanged containers from a container filling and sealing machine, said system comprising a pair of conveyor chains having horizontally spaced longitudinally movable working reaches, a plurality of yieldable clips secured to each of said chains and having container engaging edges disposed between said chains, movable means for moving a filled and sealed container between said chains and to cause the flange on the container to move into engagement with the container engaging edge of at least one clip on each of said chains, and means for moving said movable means out of contact with the container to transfer support of the container to said clips, said container being moved upwardly between said chains by said movable means which is disposed therebelow.

* * * * *